United States Patent
Borgstadt

(10) Patent No.: US 11,067,994 B2
(45) Date of Patent: Jul. 20, 2021

(54) MACHINE CONTROL THROUGH ACTIVE GROUND TERRAIN MAPPING

(71) Applicant: Deere & Company, Moline, IL (US)

(72) Inventor: Justin A. Borgstadt, West Des Moines, IA (US)

(73) Assignee: Deere & Company, Moline, IL (US)

( * ) Notice: Subject to any disclaimer, the term of this patent is extended or adjusted under 35 U.S.C. 154(b) by 139 days.

(21) Appl. No.: 16/211,507

(22) Filed: Dec. 6, 2018

(65) Prior Publication Data

US 2020/0183406 A1 Jun. 11, 2020

(51) Int. Cl.
*G05D 1/02* (2020.01)
*A01D 41/127* (2006.01)
*A01D 41/14* (2006.01)
*G01C 21/20* (2006.01)

(52) U.S. Cl.
CPC ......... *G05D 1/0219* (2013.01); *A01D 41/127* (2013.01); *A01D 41/141* (2013.01); *G01C 21/20* (2013.01); *G05D 1/0278* (2013.01); *G05D 2201/0201* (2013.01)

(58) Field of Classification Search
CPC .................................................. G05D 1/0219
See application file for complete search history.

(56) References Cited

U.S. PATENT DOCUMENTS

| 8,818,609 B1* | 8/2014 | Boyko | B60W 30/00 701/28 |
| 10,255,670 B1* | 4/2019 | Wu | G06T 7/0004 |
| 2007/0089390 A1* | 4/2007 | Hendrickson | A01D 91/00 56/10.2 F |
| 2015/0361642 A1* | 12/2015 | Stratton | E02F 9/205 701/461 |
| 2018/0216942 A1* | 8/2018 | Wang | G01S 17/89 |
| 2019/0156566 A1* | 5/2019 | Chen | G01C 21/32 |

* cited by examiner

*Primary Examiner* — Anne Marie Antonucci
*Assistant Examiner* — Abdalla A Khaled
(74) *Attorney, Agent, or Firm* — Joseph R. Kelly; Kelly, Holt & Christenson PLLC

(57) ABSTRACT

An elevation map generator in a mobile agricultural machine generates an elevation map by estimating an elevation value for points in front of a work machine based on a plane derived from a measured elevation point measured by a pose detection system affixed to the work machine. Each elevation value has a corresponding confidence value that varies inversely with a distance of the point from the pose detection system. As the machine moves, additional elevation values are aggregated for each point, based on the confidence values. The machine is controlled based on the aggregated evaluation values.

20 Claims, 13 Drawing Sheets

MACHINE CONTROL THROUGH ACTIVE GROUND TERRAIN MAPPING

FIELD OF THE DESCRIPTION

The present description relates to controlling a mobile machine, such as an agricultural mobile machine. More specifically, the present description relates to performing active ground terrain mapping to control a mobile work machine.

BACKGROUND

There are many different types of mobile work machines. Some such machines include construction machines, turf management machines, agricultural machines, forestry machines, among others.

Many such machines have movable portions that are controllably movable relative to a frame of the machine to change the height of the movable portion. For instance, an agricultural sprayer has a boom that has a height actuator. The height actuator can be actuated to change the height of the boom above the ground. A harvester has a header that is used to engage crop to be harvested. An actuator can be actuated to change the height of the header above the ground. There are a wide variety of other such machines as well.

The discussion above is merely provided for general background information and is not intended to be used as an aid in determining the scope of the claimed subject matter.

SUMMARY

An elevation map generator in a mobile agricultural machine generates an elevation map by estimating an elevation value for points in proximity to a work machine based on a plane derived from a pose measured by a pose detection system affixed to the work machine. Each elevation value is assigned a corresponding confidence value based on the distance of the point from the pose detection system. As the machine moves, additional elevation values for each point are aggregated into an elevation map, based on the confidence values. The machine is controlled based on the aggregated evaluation values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
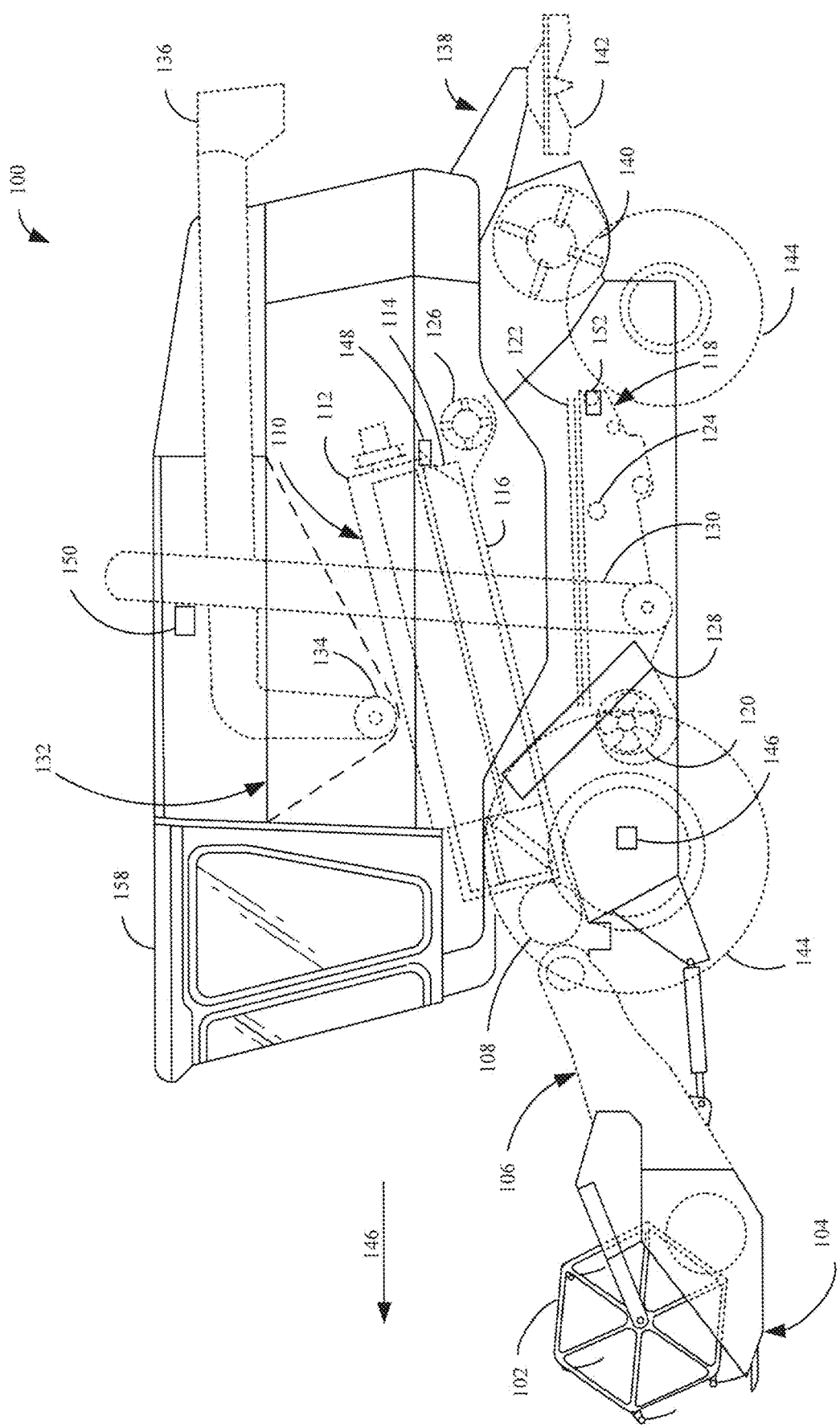
FIG. 1 is a partial pictorial, partial schematic drawing of one example of a mobile machine.

In controlling mobile machines such as those mentioned above, it can be helpful to know the elevation of the ground in an area underneath, and around, the machine being controlled. For instance, an agricultural sprayer, or an agricultural harvester, may benefit from knowing the ground terrain elevation of a field being treated by the machine. During a spraying operation, knowledge of the ground terrain assists with boom height control. In performing a harvesting operation, knowledge of the ground terrain ahead of the machine can be used to assist with header height control.

Some current systems attempt to predict the ground plane in front of a combine harvester, with no prior maps, by utilizing a global navigation satellite system (GNSS) receiver. The GNSS receiver is used to detect a pose (position and orientation) of the receiver at a given point in time. By knowing the pose of the receiver, and the dimensions of the harvester, and the orientation with which the receiver is affixed to the harvester, the ground pose of the harvester can be estimated at a point directly under the vehicle. Again, using vehicle geometry, the ground pose is used to estimate points on the ground directly under each of the ground-engaging elements of the harvester (e.g., under the front axle, as well as under each front wheel). These points are stored in a buffer as the vehicle travels over the field. These points are also referred to as a point cloud.

In the current systems, once the point cloud is a desired size, a plane can be computed, using standard techniques, through the point cloud. This plane represents a best fit through the data captured by the GNSS receiver at some point in the past (the data at the beginning of the buffer) up to the current pose (which corresponds to the data at the end of the buffer). This plane is then projected forward of the harvester in order to predict the ground elevation in front of the harvester.

However, this approach does not work well if there is any deviation in the ground height ahead of the machine, particularly the further the projection extends in front of the machine. Such attempts at using past history to predict the future (prior elevation measurements to predict elevation measurements forward of the machine), when there is no information about how the ground may be changing in front of the machine, yield poor prediction results, even for relatively flat ground. As one example, where this type of projected plane method was used to estimate elevation forward of a harvester, the actual measured height differed from the projected elevation by as much as 30 cm, or more, even over relatively flat terrain. Of course, the deviation may vary much more widely where the terrain is less flat. This can be very problematic.

For instance, when a harvester is harvesting wheat, the wheat may typically stand in a range of approximately 50-100 cm in height. When attempting to perform header height control using the method of projecting a plane ahead of the harvester, ground height deviations of up to 30 cm can have an unacceptable effect on crop volume calculations, and in performing header height control.

The present description proceeds with respect to a system that allows an operator to define a point cloud that is virtually attached to machine 100. The points in the point cloud are defined as the nodes of a (e.g., square) grid in a plane segment which projects forward as well as behind and to the sides of machine 100. The system illustratively generates an elevation value for each point in the point cloud, where the point's elevation value corresponds to an estimated elevation of the ground, surrounding machine 100, corresponding to that point's current geographical location. Because the point cloud is virtually attached to machine 100, as machine 100 travels in a travel direction, the plane also travels in that direction. Each point's elevation value has a corresponding confidence value (or weight value) that varies as a function of the distance between the point and a pose detection system that is physically affixed to machine 100. Therefore, as machine 100 travels closer to a particular geographic location, the confidence corresponding to the estimated elevation value for that geographic location increases. The elevation values are used by a control system to control a controllable subsystem on machine 100. Where machine 100 is a harvester, it can control the header height or header orientation. Where machine 100 is a sprayer, it can control the boom height. Where the machine controls one or more subsystems based on estimated crop volume, the elevation values are used in determining the crop volume. The evaluation values can be used to control a wide variety of other controllable subsystems as well, some of which are described in more detail below.

FIG. 1 is a partial pictorial, partial schematic, illustration of an agricultural machine 100, in an example where machine 100 is a combine harvester (or combine). It will be appreciated that the present description can be applied to other mobile machines as well, and combine harvester 100 is just one example. It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine or other power source that drives ground engaging elements such as wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. The height of header 102 is illustratively controlled with a height control actuator to follow the ground After the crop is cut, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other configurations, the residue is simply chopped and dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. Cleaning fan 120 directs air along an airflow path upwardly through the sieves and chaffers and the airflow carries residue can also be rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described)

can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
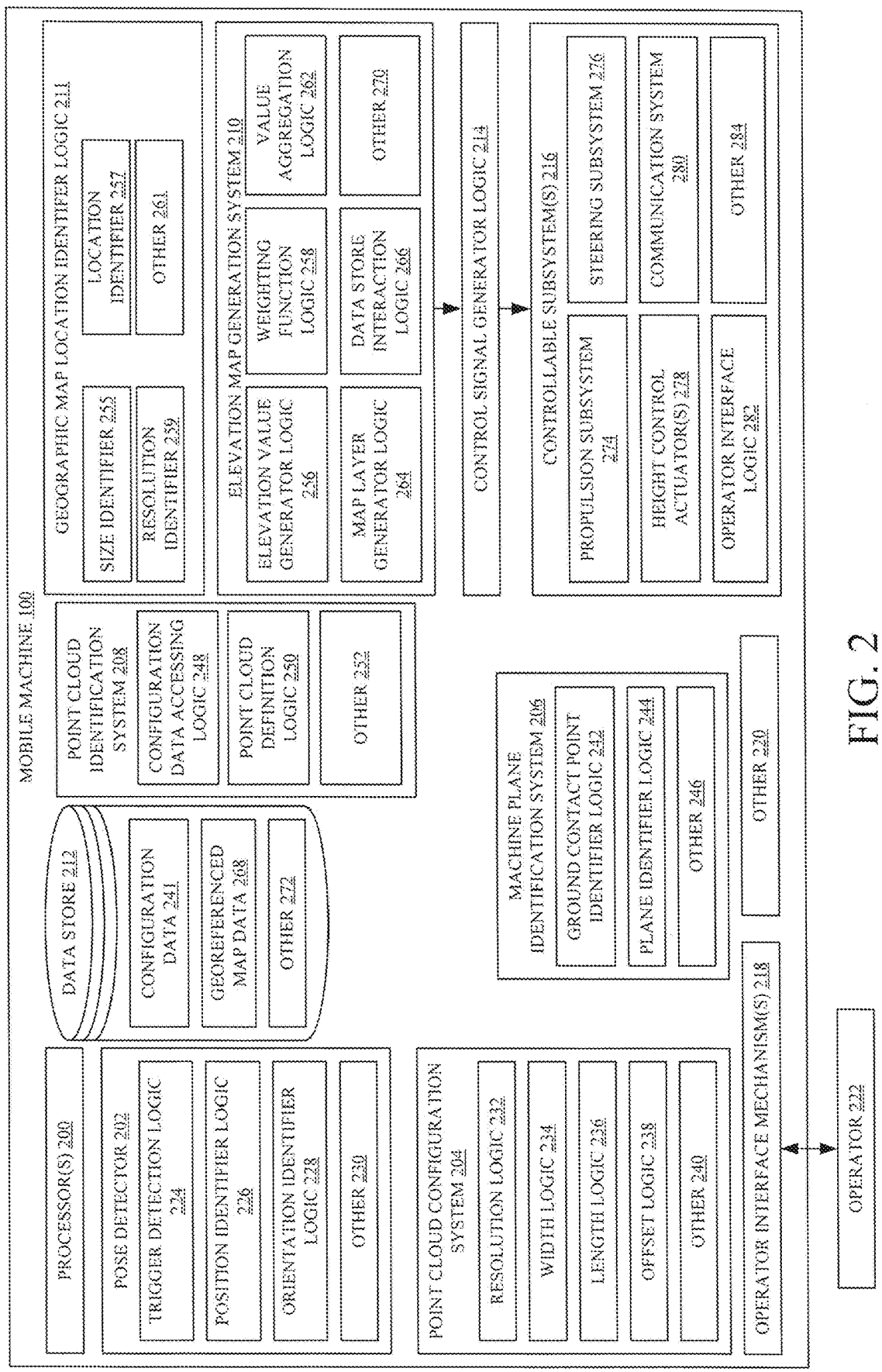
FIG. 2 is a block diagram showing certain portions of the mobile machine illustrated in FIG. 1, in more detail.

FIG. 2 is a block diagram showing one example of parts of mobile machine 100 (or harvester 100) in more detail. In the example shown in FIG. 2, mobile machine 100 includes one or more processors 200, pose detection system 202 (also referred to as a pose detector or pose sensor), point cloud configuration system 204, machine plane identification system 206, point cloud identification system 208, elevation map generation system 210, geographic map location identifier logic 211, data store 212, control signal generator logic (or control system) 214, controllable subsystems 216, operator interface mechanisms 218, and it can include a wide variety of other items or functionality 220. FIG. 2 also shows that, in one example, operator 222 interacts with operator interface mechanisms 218 in order to control and manipulate mobile machine 100. Operator interface mechanisms 218 can include a wide variety of operator interface mechanisms, such as levers, a steering wheel, joysticks, buttons, linkages, pedals, etc. In addition, it can include visual display mechanisms that display operator actuatable elements on the display, which can be actuated by operator 222 using a touch gesture, a point and click device, etc. The operator actuatable elements can include such things as icons, links, actuatable buttons, etc. Further, operator interface mechanisms 218 can include a microphone and corresponding speech recognition logic as well as a speaker and corresponding speech synthesis logic. It can include a wide variety of other visual, audio or haptic interface mechanisms as well.

Before describing the operation of mobile machine 100 in generating an elevation map and using that map to control one or more controllable subsystems 216, a brief description of some of the items in mobile machine 100, and their operation will first be provided.

Pose detector 202 illustratively includes trigger detection logic 224, position identifier logic 226, orientation identifier logic 228, and it can include a wide variety of other items 230. Trigger detection logic 224 detects a trigger that indicates when pose detector 202 is to perform a detection operation or measurement. The trigger can be a time-based trigger, so that system 202 performs a pose detection measurement periodically or intermittently. It can be a distance traveled trigger. In that case, trigger detection logic 224 may receive inputs (such as from a ground speed sensor or other sensor) that indicate how far mobile machine 100 has traveled since the last pose detection operation was performed. Trigger detection logic 204 can detect a wide variety of other triggering criteria as well.

Once triggered, pose detector 202 detects a pose of detector 202 or of machine 100 and generates a pose signal indicative of this. For instance, position identifier logic 226 can identify a geographic position of pose detector 202. It can generate a position signal indicative of this. Orientation identifier logic 228 illustratively identifies an orientation of pose detector 202. In one example, the orientation is identified relative to a gravity vector or in other ways. Knowing the dimensions of mobile machine 100 with the pose detector geographic position and orientation, the pose detector 202 can also identify the geographic position of various portions of machine 100 (such as the nominal positions of its wheel, or other ground-engaging elements, etc.). It will thus be appreciated that pose detector 202 can include a global position system (GPS) receiver or other GNSS receiver, or it can include a wide variety of other positioning systems and orientation detection systems, such as accelerometers, LORAN system, a dead reckoning system, a cellular triangulation system, or a wide variety of other position and orientation detection systems.

Point cloud configuration system 204 illustratively includes resolution logic 232, width logic 234, length logic 236, offset logic 238, and it can include a wide variety of other items 240. Resolution logic 232 illustratively uses operator interface mechanisms 218 in order to surface a user interface mechanism that allows an operator to set a resolution of a point cloud that will be used to identify ground elevations. In one example, the point cloud is defined as the nodes of a square grid in a plane segment that is coplanar with a plane segment defined by the contact points of some or all of the wheels or other ground-engaging elements on machine 100, with the ground. The point cloud grid has a length and a width and a spacing (or resolution). Resolution logic 232 allows an operator (or other user) to set the spacing (or resolution) between the points. In the example described herein, the spacing (or resolution) is set to 10 cm. Thus, the resolution represents the distance by which each point in the point cloud is separated from adjacent points. This is described in greater detail below with respect to FIGS. 4A and 4B. This is just one example, and a wide variety of other resolution values can be used as well.

Width logic 234 illustratively controls operator interface mechanisms 218 to surface an operator input mechanism that allows operator 222 to set a width of the point cloud. Length logic 236 does the same except that it allows the operator to set the length of the point cloud. The width and length of the point cloud define the area of the plane segment for which elevation values will be generated.

Offset logic 238 illustratively surfaces a user interface mechanism that allows operator 222 to offset the point cloud in one or more directions from the location of the pose detector 202. For instance, it may offset the point cloud to one side of mobile machine 100, preferentially, because that side of mobile machine 100 has crop that has yet to be harvested while the crop on the opposite side has already been harvested. In another instance, it may offset the point cloud below the pose detector 202 to the nominal location of the mobile machine 100 wheel contact points or other ground engaging elements.

Machine plane identification system 206 includes ground contact point identifier logic 242, plane identifier logic 244, and it can include other items 246. Machine plane identification system 206 identifies a machine plane (or ground plane for the ground under machine 100) defined by the points of contact of mobile machine 100, with the ground. By knowing the dimensions of mobile machine 100, and the relationship of pose detection system 202 (which is affixed to the machine) relative to machine 100, ground contact point identifier logic 242 can identify the ground contact points of the ground-engaging elements (e.g., wheels) of mobile machine 100, with the ground, based upon the pose identified by pose detection system 202 and additional compensation for changes in tire inflation, vehicle dynamics, etc. Plane identifier logic 244 can then identify the machine plane segment (or ground plane) which is the plane that encompasses the points of contact of machine 100 with the ground Point cloud identification system 208 then identifies a set of points in a point cloud where the set of points define a plane segment (the point cloud plane segment) that is coplanar with the machine plane identified by system 206. The size of the point cloud plane segment is defined by the configuration information received by point cloud configuration system 204. Therefore, point cloud identification system 208 illustratively includes configuration data accessing logic 248, point cloud definition logic 250, and it can include other items 252. Configuration data accessing logic 248 illustratively accesses the configuration data 241. The configuration data 241 illustratively identifies the resolution (grid cell size or point spacing), the width, and the length of the point cloud. It also illustratively identifies the offset of the point cloud, if it is offset in one or more directions relative to pose detection system 202 on machine 100. Knowing the location and orientation of the machine plane segment, and knowing that the points in the point cloud will be coplanar with the machine plane segment, and having thus accessed the configuration data which identifies the size and offset of the point cloud, point cloud definition logic 250 defines the point cloud (e.g., it identifies a point cloud plane segment that is configured as indicated by the configuration data).

Geographic map location identifier logic 211 allows a user to generate a map structure (or it can be generated automatically) that represents a geographic location for which elevation values are to be generated. This may be, for instance, the location of a field to be harvested. Size identifier 255 allows an operator to set a size of the field, such as a number of meters in the easting and northing directions. Location identifier 257 allows the user to input longitude and latitude values so the size values are now pinned (or otherwise correlated) to a geographic location on earth. Resolution identifier 259 allows the user to specify a resolution for the map structure. Logic 211 can include other items 261 as well.

The structure output by logic 211 is thus illustratively a map grid that represents a size of a field at a particular geographic location, where cells in the map grid are defined by the resolution. It will be noted that the map structure can also be automatically generated using default values or sensed values, or it can be retrieved if it was previously generated, or it can be generated in other ways.

Figure 4A:
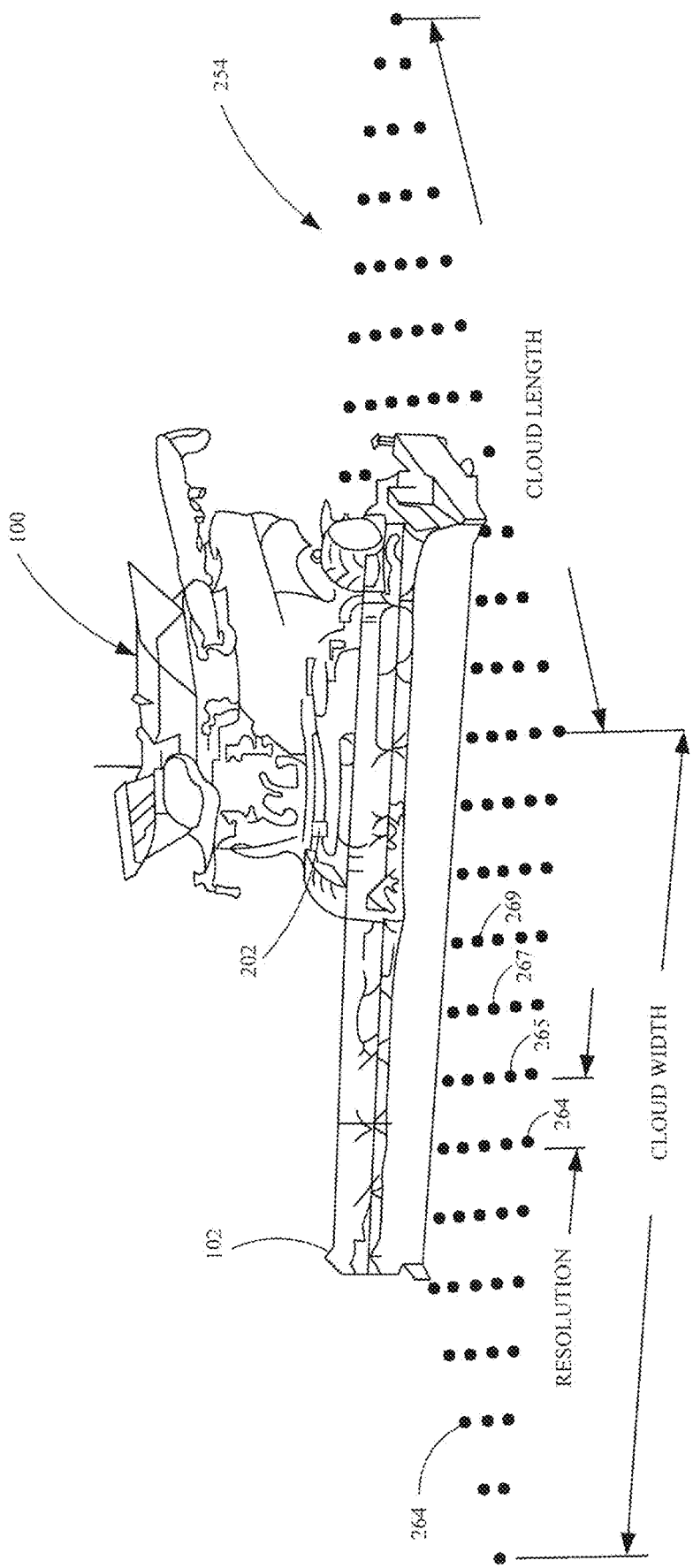
FIG. 4A is a pictorial illustration showing one example of the mobile machine illustrated in FIGS. 1 and 2, with a virtual point cloud affixed to it.
Figure 4B:
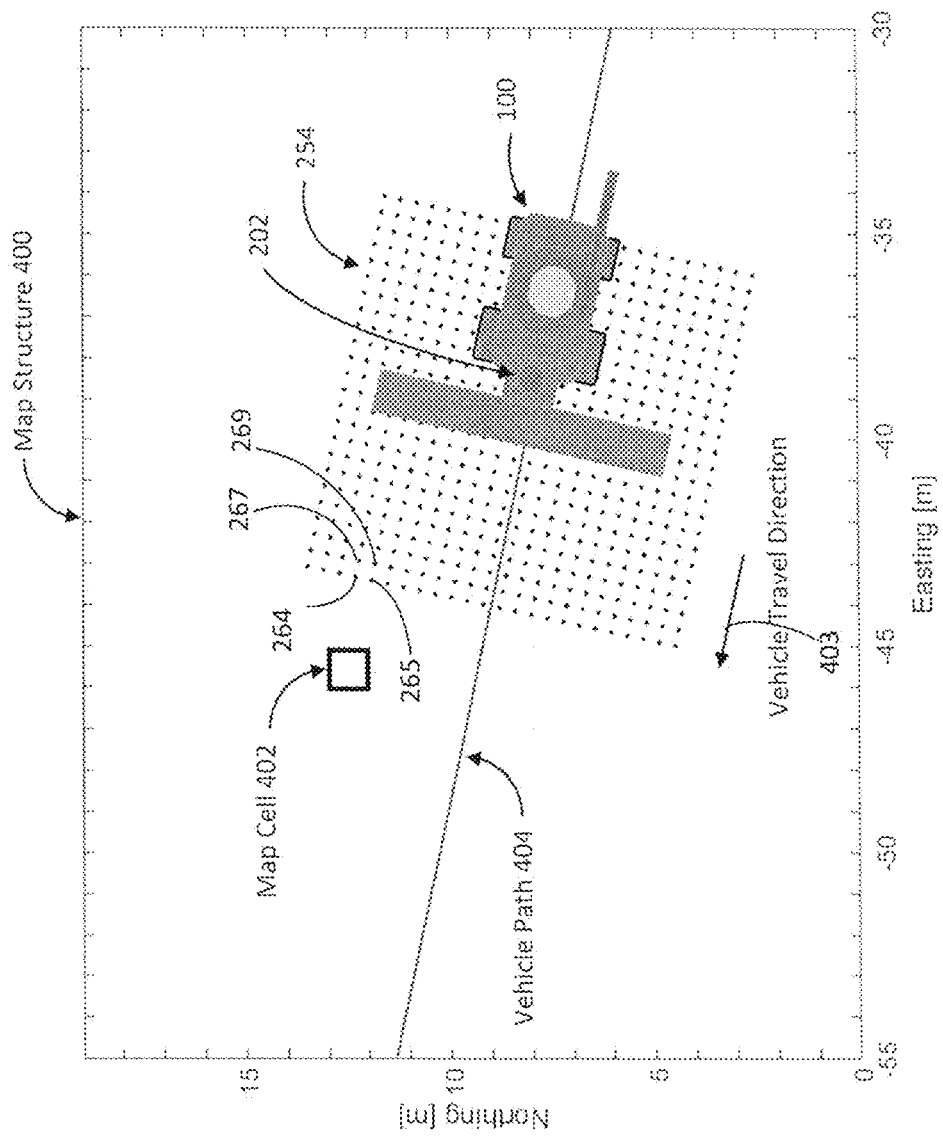
FIG. 4B is a pictorial illustration showing the mobile machine of FIG. 4A with a virtual point cloud affixed and the map structure during operation in generating an elevation map.

FIGS. 4A and 4B show examples of machine 100, traveling in direction 403 along a travel path 404 and a virtual point cloud 254 that is defined by point cloud definition logic 250. Machine 100 is shown on a field represented by a map grid (or map structure) 400. The size of the map cells 402 in map structure 400 are defined by the resolution input by the operator. Point cloud 254 illustratively includes a plurality of points, represented by the dots in the grid shown in FIGS. 4A and 4B. The dots are separated in the length direction (e.g., in a direction parallel to the direction of travel of machine 100 indicated by arrow 403), and in the width direction (e.g., in a direction transverse or perpendicular to the length direction), from one another. The size of that separation is defined by the resolution input by operator 222 (or it can be a default resolution) in the configuration information 241. In one example, the points are separated from one another in both the length and width directions by approximately 10 cm. This is just one example. It can be seen that the points in point cloud 254 define a plane segment that is estimated to be coplanar with the ground surface. In the example shown in FIGS. 4A and 4B, point cloud 254 is not offset in any direction relative to machine 100. Instead, it extends a certain number of points ahead of machine 100, and a certain number of points behind machine 100. Its width is defined as slightly larger than the width of header 102. However, it will be noted that the configuration information may define an offset that indicates that the point cloud may be offset in one or more directions so that it extends further in that direction, relative to machine 100, than in other directions. This is described in more detail below.

Once the point cloud 254 is defined (e.g., the location of each of the points in point cloud 254 is known, relative to the pose detector 202 and the machine 100), then elevation map generation system 210 generates an elevation value corresponding to each of the points in point cloud 254. Elevation value generator logic 256 generates these values by using the current pose output from the pose detector 202 and knowing the relative position of each point in point cloud 254 with respect to the pose detector 202. It computes the current geographic position including the elevation value for each virtual point in the point cloud. The elevation value for each virtual point in the point cloud is only an estimation of the ground elevation at that geographic position.

It can be seen from FIG. 4B that there may be more than one point (in point cloud 254) within a given map cell 402. In that case, the estimated elevation values for those points are combined (such as averaged) to give an estimated elevation value for that map cell.

It will be appreciated that, the further a point in point cloud 254 is from machine 100 in either the length or width directions, the less reliable will be the elevation value, corresponding to that virtual point in point cloud 254, in estimating the true elevation of the ground at the geographic location of that virtual point. Therefore, in one example, a weighting function value is also generated for each of the virtual points in point cloud 254. The weighting function value is indicative of a confidence level corresponding to each elevation value generated for each virtual point. The weighting function generates a value that is a function of the distance of each of the virtual points relative to the position of pose detector 202 (which will represent a most accurate elevation in point cloud 254). In this way, the virtual point in point cloud 254, nearest the pose detector 202, is weighted the highest, with the most confidence, whereas the points furthest away have the lowest confidence. The weighting function is applied by weighting function logic 258 in FIG. 2.

Figure 5A:
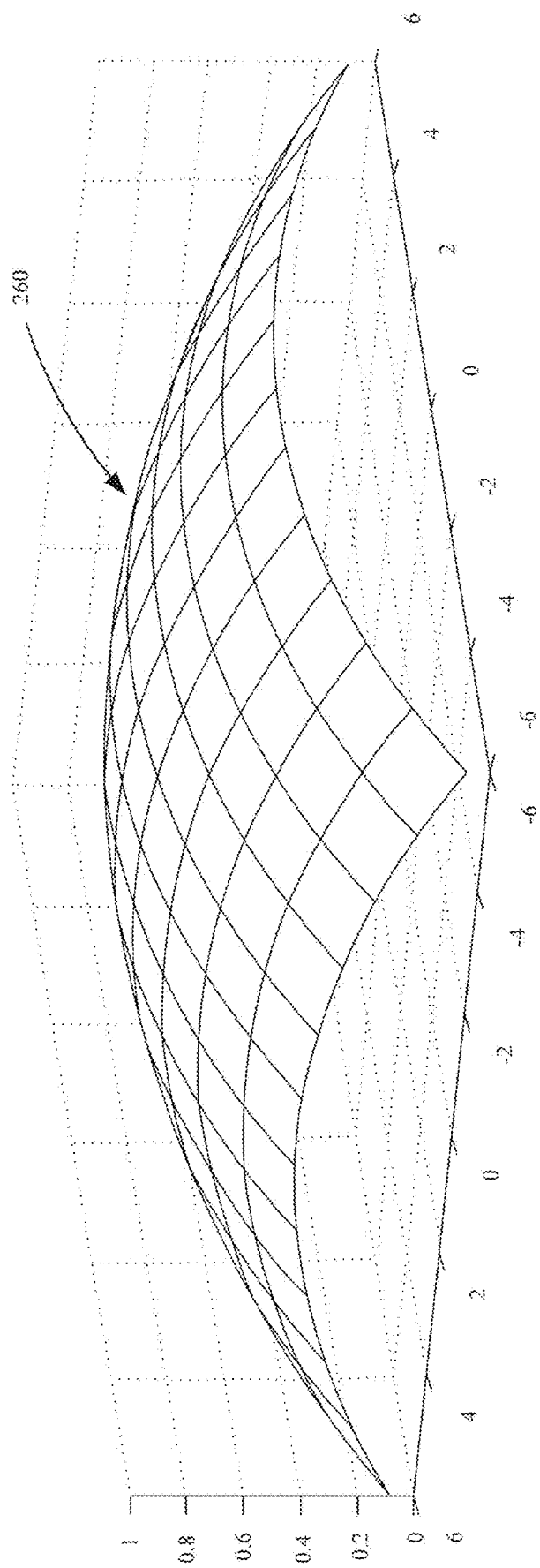
FIGS. 5A and 5B are graphical illustrations of examples of distance based weighting functions used to identify a confidence score for elevation values identified for the point cloud shown in FIGS. 4A and 4B.

FIG. 5A is a graph showing one example of a weighting function 260 corresponding to the points in the point cloud 254 shown in FIGS. 4A and 4B. In the example illustrated in FIG. 5A, the weighting function is that indicated by Equation 1 below.

$$w_{i,j} = 1 - m\left(\frac{r_{i,j}}{r_{max}}\right)^n \quad \text{Eq. 1}$$

The term $w_{i,j}$ is the weight value assigned to a point at location (i, j) in point cloud 254 where i and j are grid indices.

The value $r_{max}$ is the northing/easting distance from the pose detector 202 (e.g., the GPS receiver) to the virtual point in point cloud 254 furthest from the receiver (as determined by the width, length and offset configuration inputs).

The value of $r_{i,j}$ is the northing/easting distance to each virtual point in point cloud 254 from the receiver northing/easting location.

The weighting function in Equation 1 is illustratively provided with two configurable parameters n and m. These can be set to values such as n=2 and m=0.9, in one example. In this way, the highest confidence point has a weight of 1.0 where the weighting drops off with the square (because n=2) of the distance between the virtual point for which the weight is being calculated and the receiver that embodies pose detector 202. The virtual points on the furthest edges of point cloud 254 will have values of no less than 0.1, because m=0.9. This is done in order to gather some information even at the furthest distances from the pose detector 202.

Figure 5B:
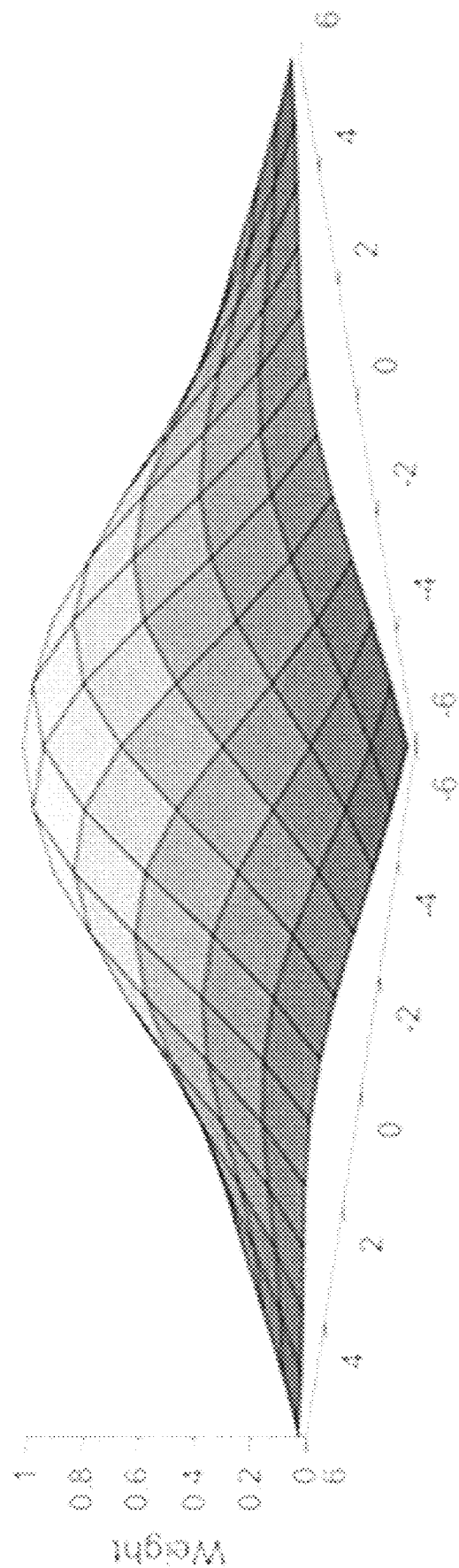

FIG. 5B is a graph showing another example of a weighting function 260 corresponding to the points in the point cloud 254 shown in FIGS. 4A and 4B. In the example illustrated in FIG. 5B, the weighting function is that indicated by Equation 2 below.

$$w_{i,j} = Ae^{-k(r_{i,j}-r_0)^2} \quad \text{Eq. 2}$$

The term $w_{i,j}$ is the weight value assigned to a point at location (i, j) in point cloud 254 where i and j are grid indices.

The value A is a scaling constant.

The value $r_0$ is the northing/easting distance from the pose detector 202 (e.g., the GPS receiver) to the virtual point in point cloud 254 chosen to have the highest confidence.

The value k represents the rate at which the confidence value drops off as the distance to virtual points in the point cloud increases from the $r_0$ distance.

The value of $r_{i,j}$ is the northing/easting distance to each virtual point in point cloud 254 from the receiver northing/easting location.

The weighting function in Equation 2 is illustratively provided with three configurable parameters A, $r_0$, and k. The first two can be set to values such as A=1 and $r_0$=0, in one example. In this way, the highest confidence point has a weight of 1.0 (A=1) at the receiver position ($r_0$=0). The value of k can be set to 0.04, in one example. In this way, the confidence drops off exponentially as a function of the squared distance between the virtual point for which the weight is being calculated and the receiver that embodies pose detector 202. The virtual points on the furthest edges of point cloud 254 will have small non-zero values. This is done in order to gather some information even at the furthest distances from the pose detector 202.

Referring again to FIGS. 4A and 4B, as machine 100 moves along path 404 over the field represented by map structure 400, different points in point cloud 254 will pass over the same map cell. As this happens, the elevation values for those points are aggregated by aggregation logic 262 with elevation values from other points in point cloud 254 that already passed over that map cell 402. For example, at each position where machine 100 takes a pose measurement, the points in point cloud 254 will correspond to a geographic location, (a map cell 402 in the map structure 400) and that map cell 402 will be assigned an elevation value and a weight value based on the points in the point cloud 254 that are in that map cell when the pose measurement is taken. As machine 100 moves and takes another measurement, some of the map cells 402 will now be closer to pose detector 202 and therefore the elevation values generated for the points in point cloud 254 that are in those map cells will have a higher weight or confidence value.

For example, as machine 100 moves along path 404, the first virtual points that are in map cell 402 will be points 264 and 265 in point cloud 254. Therefore, the elevation values for those two virtual points will be aggregated to identify an initial elevation value for map cell 402. However, as machine 100 continues to move, the virtual points in point cloud 254 that are in map cell 402 will be virtual points 267 and 269, which are closer to pose detector 202 than points 264 and 265. The elevation value generated for those virtual points will then be aggregated with the elevation value that was previously generated for map cell 402 based on the values for virtual points 264 and 265, when they were in cell 402. Because virtual points 267 and 269 are closer to pose detector 202, they will have a higher confidence score. This can be used in aggregating the elevation values. For instance, the values generated for points 267 and 269 may be weighted differently from one another, and more, in the aggregation, than the values generated for points 264 and 265. The weighting of points 264 and 265 can be different from one another as well.

In addition to aggregating the elevation values, value aggregation logic 262 can aggregate the weighting values as well. For instance, map layer generator logic 264 can generate a plurality of different map layers for map structure 400 based on the values corresponding to point cloud 254. As an example, the map layers can include elevation values for each map cell 402 in structure 400, weighting values for each cell 402, among other things (some of which are described below). Data store interaction logic 266 then stores the map layers as georeferenced map data 268 in data store 212, which can also include other items 272. Elevation map generation system 210 can include other items 270 as well. Based upon the elevation values and other information in the elevation map structure in georeferenced map data 268, control signal generator logic 214 generates control signals to control controllable subsystems 216. For instance, it can generate control signals to control propulsion system 274 to change the speed of mobile machine 100. It can generate control signals to control a steering subsystem 276 to control the direction of travel of mobile machine 100. It can generate control signals to control height control actuators 278 that control the height of header 102 (or of a boom where machine 100 is a sprayer, or other height actuators). It can generate control signals to control communication system 280 to communicate the georeferenced map data 268 to other (e.g., remote) computing systems over a network, such as a wide area network, a local area network, a near field communication network, a cellular communication network, or a wide variety of other networks or combinations of networks. Control signal generator logic 214 can generate control signals to control operator interface logic 282 which, in turn, can be used to generate outputs on operator interface mechanisms 218 and/or receive operator inputs through operator interface mechanisms 218. Control signal generator logic 214 can generate a wide variety of other control signals to control other controllable subsystems 284, as well.

Figure 3A:
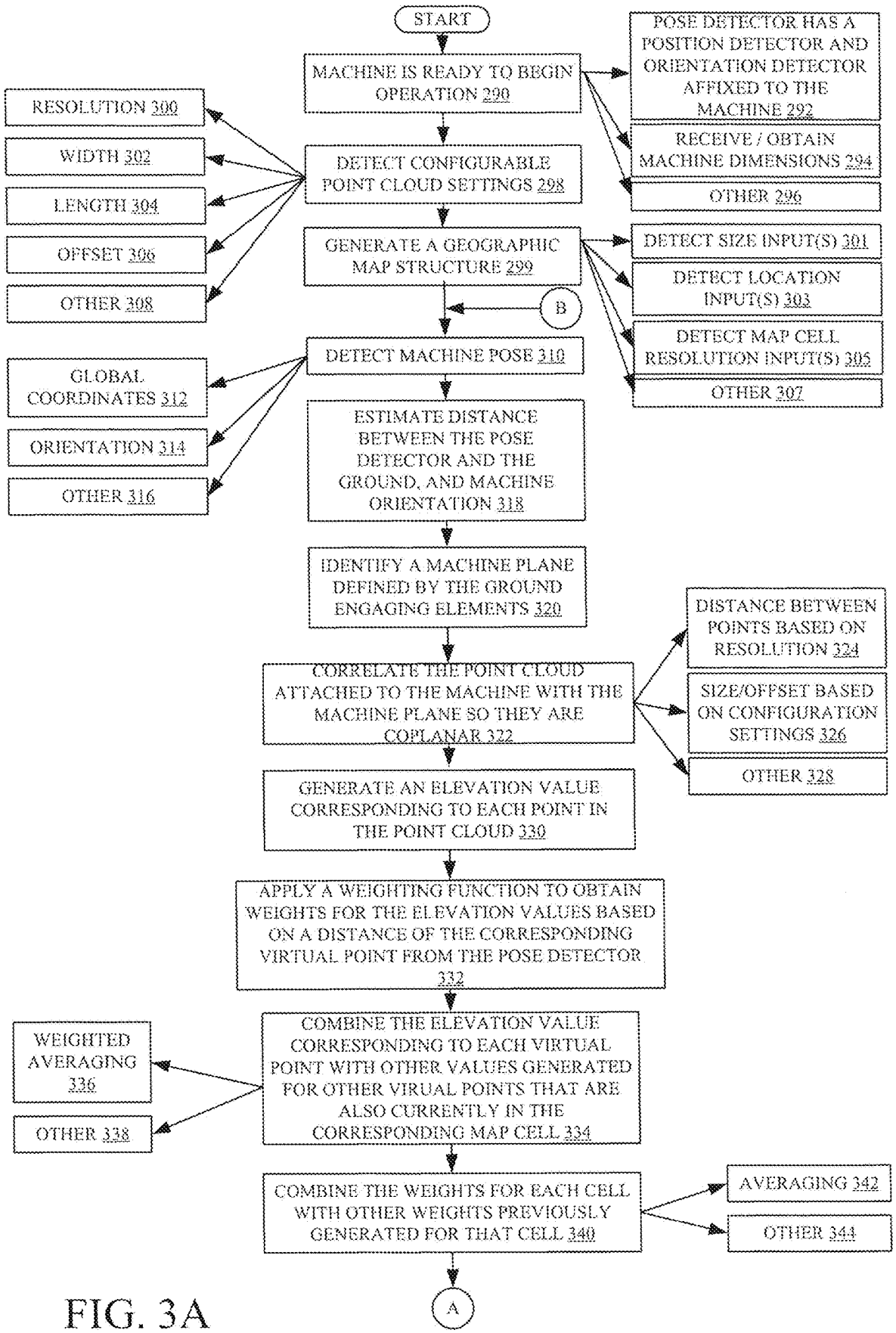
FIGS. 3A and 3B illustrate a flow diagram showing one example of the operation of the mobile machine illustrated in FIG. 2 in generating an elevation map.
Figure 3B:
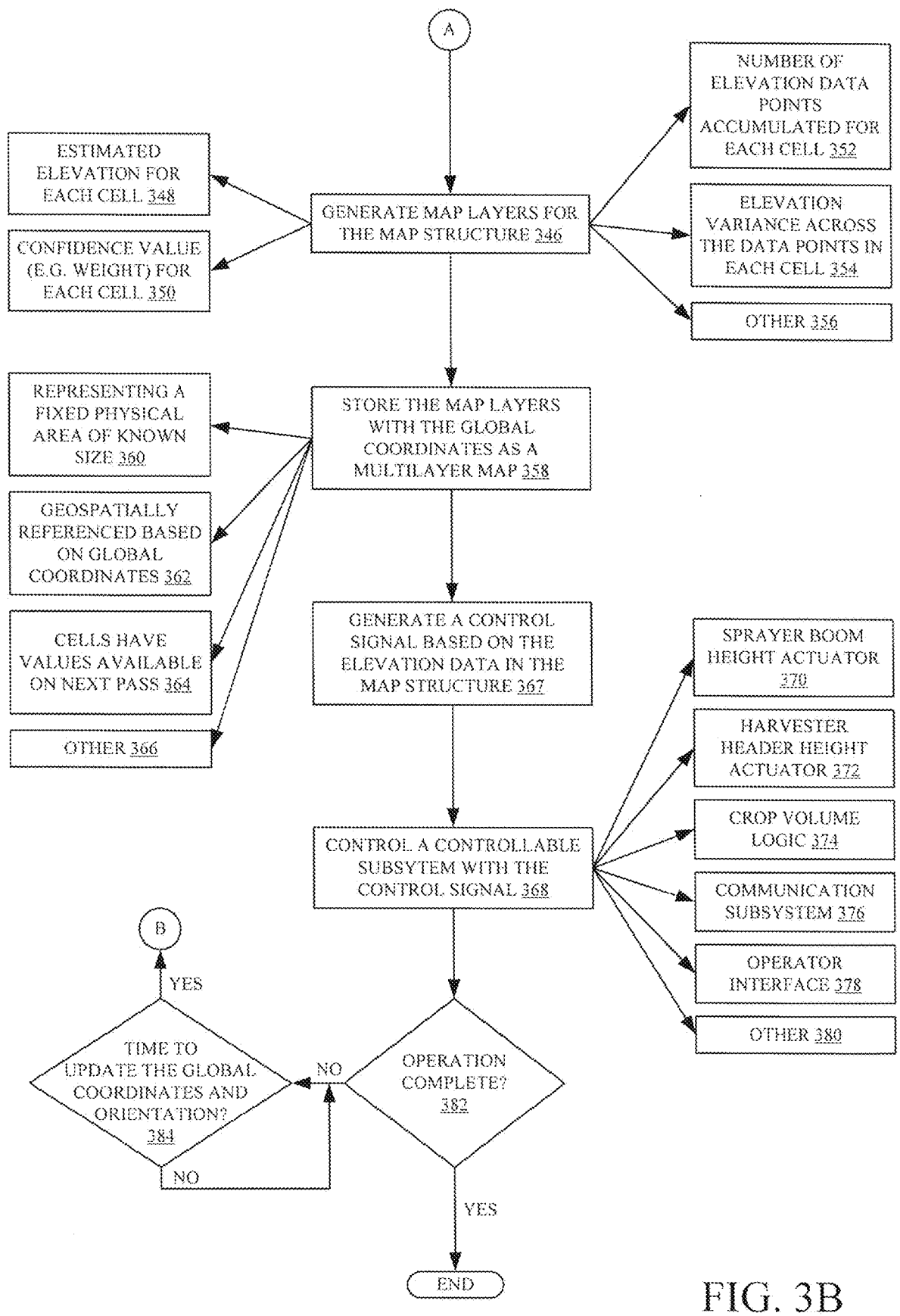

FIGS. 3A and 3B (collectively referred to herein as FIG. 3) illustrate one example of the operation of machine 100 in generating estimated elevation values for geographic locations in a field, using the virtual point cloud 254, virtually attached to machine 100, that has weighting values that are related to the distance from the pose detector 202 in machine 100. It is first assumed that machine 100 is ready to begin an operation. This is indicated by block 290 in the flow diagram of FIG. 3. In one example, pose detector 202 is affixed to machine 100. This is indicated by block 292. The system also illustratively receives or obtains the dimensions of machine 100, and the location and orientation in which pose detector 202 is attached to machine 100. Receiving or obtaining these dimensions is indicated by block 294 in the flow diagram of FIG. 3. The machine can be configured for operation in other ways as well, and this is indicated by block 296.

Point cloud configuration system 204 then detects configurable point cloud settings. This is indicated by block 298. In one example, those settings may already be provided, as default values or previously stored configuration data 241 or otherwise. In another example, they can be provided through operator input mechanisms. The configuration inputs can include resolution 300, width 302, length 304, offset 306, and it can include other items 308.

Geographic map location identifier logic 211 then generates a map structure 400 corresponding to the field over which machine 100 will travel. This is indicated by block 299. Size identifier 255 can detect a size input as indicated by block 301. Location identifier 257 can detect a location input to tie or correlate the map structure to a geographic location. This is indicated by block 303. Resolution identifier 259 detects a map cell resolution input that defines the size of the map cells 402 in structure 400. This is indicated by block 305. The map structure 400 can be generated in other ways as well, as indicated by block 307. The map structure 400 is thus composed of discrete cells 402 of a preconfigurable size where a point in each cell 402 represents the elevation over a known area represented by that cell. As an example, the map structure 400 can represent a wheat field that is 800 meters long in the northing directing by 400 meters wide in the easting direction with a known latitude and longitude origin, and it can have cells that are 20 cm by 20 cm in size. Each cell holds the average elevation of the ground within the cell's 20 cm by 20 cm boundary, as is described below. In one example, the map cells are larger than the point cloud resolution. For instance, the point cloud resolution may be half the map cell size so virtual point elevation values are aggregated into every map cell covered by the point cloud. Thus, if the map cells are 20 cm×20 cm in size, the virtual point cloud resolution may be 10 cm×10 cm. Thus, at this point, both map structure 400 and point cloud 254 are defined.

Trigger detection logic 224 then detects that it is time to perform a pose detection operation. This is indicated by block 310. Position identifier logic 226 obtains a set of global coordinates indicative of the geographic location corresponding to the pose detector 202 and thus corresponding to the point cloud for which elevation and confidence values will be generated. This is indicated by block 312. Orientation identifier logic 228 illustratively identifies an orientation of machine 100 as well. This is indicated by block 314. The machine pose can include other items as well, and this is indicated by block 316.

Machine plane identification system 206 then identifies a machine plane (or ground plane) segment indicative of the ground under machine 100. To do so, ground contact point identifier logic 242 uses the dimensions of machine 100 to estimate the position of points where the ground-engaging elements (e.g., wheels) of machine 100 contact the ground. It can estimate the geographic position and elevation of the contact points where the ground-engaging elements contact the ground using, for example, nominal tire and machine size values obtained from a machine model or otherwise. It can also generate these estimates by measuring the distance of the pose detector 202 to the ground and by sensing or measuring the machine orientation (which may change when the header 102 is lifted, or when the machine is full of grain, for example). Estimating or otherwise identifying the distance between the pose detector 202 and the ground, as well as machine orientation, is indicated by block 318 in the flow diagram of FIG. 3.

Plane identifier logic 244 then identifies a machine plane segment that is defined by the ground contact points for the ground-engaging elements. This is indicated by block 320. The plane segment will thus be oriented generally as a ground plane which follows the slope of the ground and other orientation of the ground, on which the ground-engaging elements are resting.

Point cloud identification system 208 then correlates the point cloud (e.g., point cloud 254 in FIGS. 4A and 4B) to the machine plane segment so the virtual points in the point cloud are coplanar points, virtually attached to machine 100, and are also coplanar with the machine plane segment (or an estimate of a plane that is coplanar with the ground surface). This is indicated by block 322 in the flow diagram of FIG. 3. The distance between the points in the point cloud is determined based upon the resolution configuration input. This is indicated by block 324. The size and offset characteristics of the point cloud (e.g., its length, width and offset measurements) are based on the length, width and offset configuration inputs as well. This is indicated by block 326. The point cloud can be defined in other ways as well, and this is indicated by block 328.

In this way, the point cloud 254 can move with machine 100 over the field, and it can virtually move relative to mapping structure 402 that physically represents a fixed area of known size (e.g., the field), geospatially referenced to a global coordinate system.

Next, a measurement is taken by pose detector 202, and, elevation value generator logic 256 generates an elevation value corresponding to each point in the point cloud. This is indicated by block 330 in the flow diagram of FIG. 3. It does this by assuming that the points in the point cloud (e.g., point cloud 254) are resting on the ground. By extrapolating the slope of the point cloud 254 outwardly to the edges of the point cloud 254, each point will have an estimated elevation value. At each trigger step, as the machine 100 moves through the field, the pose measurement from pose detector 202 is used to update the global coordinates of the virtual point cloud 254. Using these global coordinates, each individual point is then spatially matched to a discrete cell 402 in the globally fixed map structure 400, and elevation values for each point are generated.

Weighting function logic 258 then applies a weighting function to obtain weights for the elevation values based on a distance of the corresponding virtual point from the pose detector 202. This is indicated by block 332 in the flow diagram of FIG. 3. The elevation values corresponding to each point are then combined with other values of other virtual points that are also within the same map cell 402 in which the virtual point resides. This is indicated by block 334. Value aggregation logic 262 can do this by using weighted averaging as indicated by block 336, or in other ways as indicated by block 338. Further, the elevation of the individual position corresponding to each map cell 402 can be aggregated with the previously-estimated elevation values for the geographic position corresponding to that map cell 402 using the weighting function, and using recursive weighted averaging or in another way. In this way, the elevation values with lower confidence when the machine 100 was further away from the map cell 402 are merged with higher confidence elevation values when the machine 100 is located closer to the map cell. Value aggregation logic 262 can also combine the weights for each cell previously generated for the geographic location corresponding to that cell 402 as indicated by block 340. Using weighted averaging to aggregate the values is indicated by block 342, and using other mechanisms is indicated by block 344.

To aide in the process of mapping the elevation values, map layer generator logic 264 can generate multiple layers in the map data structure. The first layer can, for instance, hold the average cell elevation and additional layers can hold the average cell weight (or confidence value), the number of points accumulated to obtain the average cell elevation, the elevation variance across those points, among other things. Generating map layers corresponding to the map structure 400 is indicated by block 346 in the flow diagram of FIG. 3. Having one layer being the estimated elevation for each cell 402 is indicated by block 348. Having one layer represent the confidence value (or the weighted combination of confidence values) for each cell is indicated by block 350. Having a layer represent the number of elevation data points accumulated for a given cell 402 is indicated by block 352, and having a layer represent the elevation variance across the data points in each cell 402 is indicated by block 354. It will be noted that map layer generator logic 264 can generate other map layers as well, and this is indicated by block 356.

Data store interaction logic 266 then illustratively interacts with data store 212 to store the map layers as georeferenced map data 268. This is indicated by block 358 in the flow diagram of FIG. 3. The map structure 400 represents a fixed physical area of known size. This is indicated by block 360. It is geospatially referenced based on the global coordinates obtained by pose detector 202 or the operator or elsewhere. This is indicated by block 362.

Some of the cells 402 in each map structure 400 can overlap with the point cloud 254 on multiple passes through the field. For example, it may be that the point cloud 254 is offset to one side of machine 100 and extends past header 102 to the side of machine 100. In that case, there may be elevation values available in map cells 402 that have not yet been harvested. These values can be used on the next machine pass, because machine 100 will be traversing those cells to harvest. Cells 402 having values available on a next pass is indicated by block 364. The map structure 400 can be stored in other ways as well, and this is indicated by block 366.

Control signal generator logic 214 then generates one or more control signals based upon the elevation data in the geospatially referenced map structure. This is indicated by block 367. The control signal is then applied to a controllable subsystem 216 to control that controllable subsystem with the control signal. This is indicated by block 368. This can take a wide variety of different forms. For instance, the control system can control a height control actuator 278 which comprises a sprayer boom height actuator that controls the boom height on a sprayer. This is indicated by block 370. It may be harvester header height actuator that controls the height of a header 102 on a harvester in order to perform ground following operations. This is indicated by block 322. It may control crop volume estimation logic that is estimating crop volume ahead of a harvester, based on the height of the crop above the ground. This is indicated by block 374. It can control communication system 280 in order to communicate the map information or other information to a remote system. The remote system may be a vendor system, a farm manager system, or a wide variety of other remote systems. Controlling the communication system 280 is indicated by block 376 in the flow diagram of FIG. 3.

Control signal generator logic 214 can generate control signals to control operator interface logic 282 which, in turn, controls operator interface mechanisms 218. This can control those mechanisms to display information for the operator, to display actuators for the operator or receive inputs, to generate alerts, or haptic, audio or other feedback, or to control the operator interface mechanisms 218 in other ways. This is indicated by block 378.

Control signal generator logic 214 can generate control signals to control other controllable subsystems as well. This is indicated by block 380.

At block 382, it is determined whether the operation of machine 100 is complete. If not, then trigger detection logic 224 in pose detector 202 determines whether it is time to update the global coordinates and orientation of machine 100, so that additional values for cells 402 in the map structure 400 can be generated using a point cloud 254. This is indicated by block 384. If so, processing reverts to block 310 where the machine pose is detected. If not, then pose detector 202 waits until the desired triggering criteria have been detected.

It can be seen that by setting the resolution of the virtual point cloud 254 smaller than the resolution of the map cells 402 in a map structure 400, each map cell 402 is guaranteed to collect at least one data point as the point cloud 254 (which is attached to machine 100) passes over the ground corresponding to the map cells 402. This type of active mapping can be used to generate elevation maps for an entire field. Those maps, as discussed above, can be stored as georeferenced map data 268, and they can be communicated to other systems for later use. They can be used in other operations which would benefit from knowing ground elevation.

In another example, the active mapping can be used on-the-fly, to predict ground elevation in a region of interest (e.g., in a region forward of a machine, such as a harvester). The point cloud 254 can be configured by the operator in such a way that the points cover the region of interest. Additionally, elevation data for point cloud 254 can be estimated so that it is available for future passes through the field by expanding the point cloud 254 to one or both sides of machine 100, beyond the width of the header 102 (or other harvesting or treatment mechanism). In this way, elevation data (which may have a relatively low confidence level) is accessible on the next pass, for any given operation. As the machine makes the next pass, the elevation in each global map cell 402 will be updated with higher confidence elevation data, thus improving the map.

In yet another example, a prior map of elevation may be available for a particular field along with weighting values. The active mapping discussed herein can be used to merge new data with the existing data from the existing map in order to produce a newer, up-to-date, map that accounts for any contour changes since the previous mapping operation was performed.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
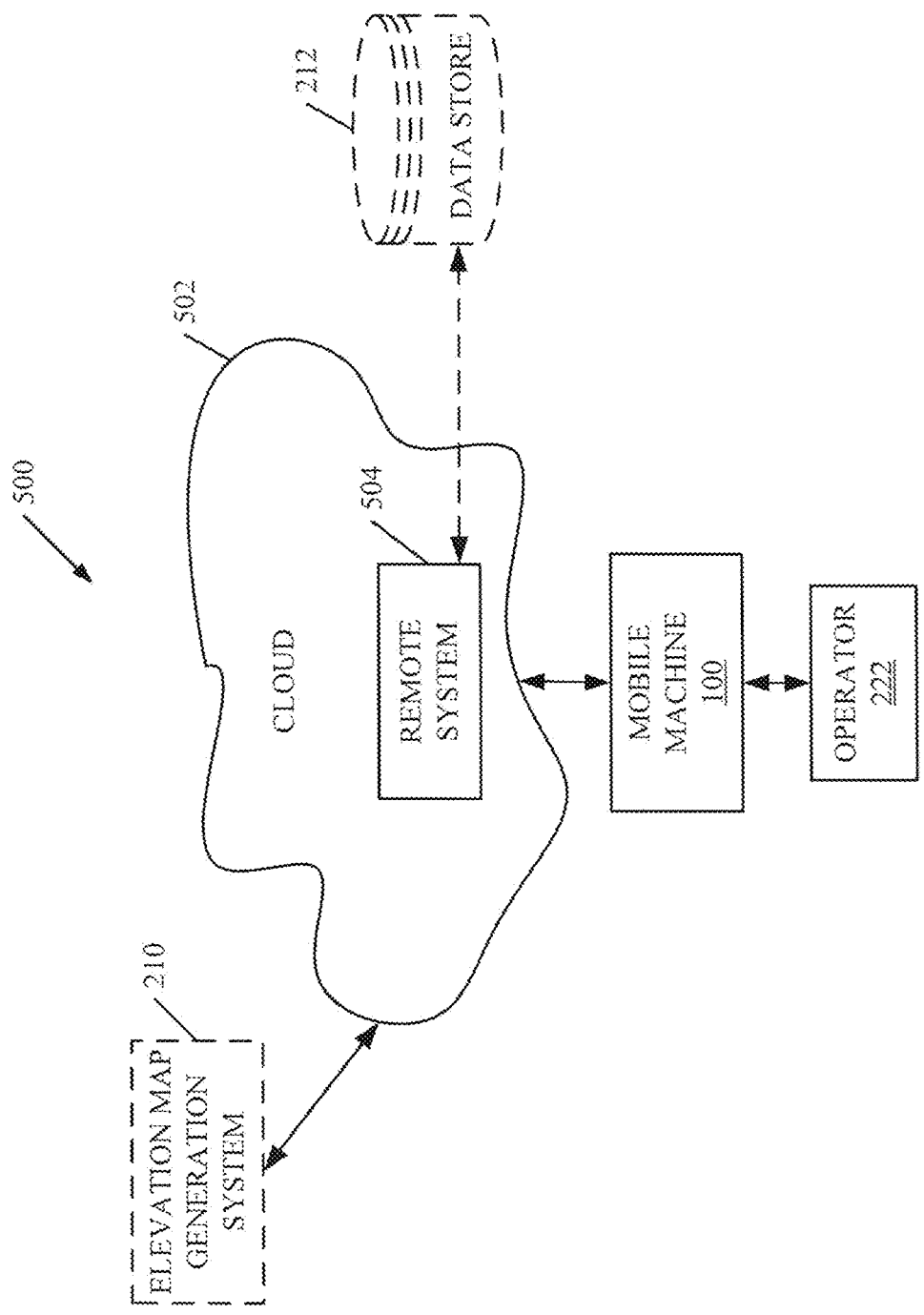
FIG. 6 shows one example of the mobile machine illustrated in FIGS. 1 and 2, deployed in a cloud computing architecture.

FIG. 6 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 6, some items are similar to those shown in FIG. 2 and they are similarly numbered. FIG. 6 specifically shows that remote systems 504, system 210 and/or data store 212 can be located at a remote server location 502. Therefore, harvester 100 accesses those systems through remote server location 502.

FIG. 6 also depicts another example of a remote server architecture. FIG. 6 shows that it is also contemplated that some elements of FIG. 1 are disposed at remote server location 502 while others are not. By way of example, data store 212 or system 210 or other items can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
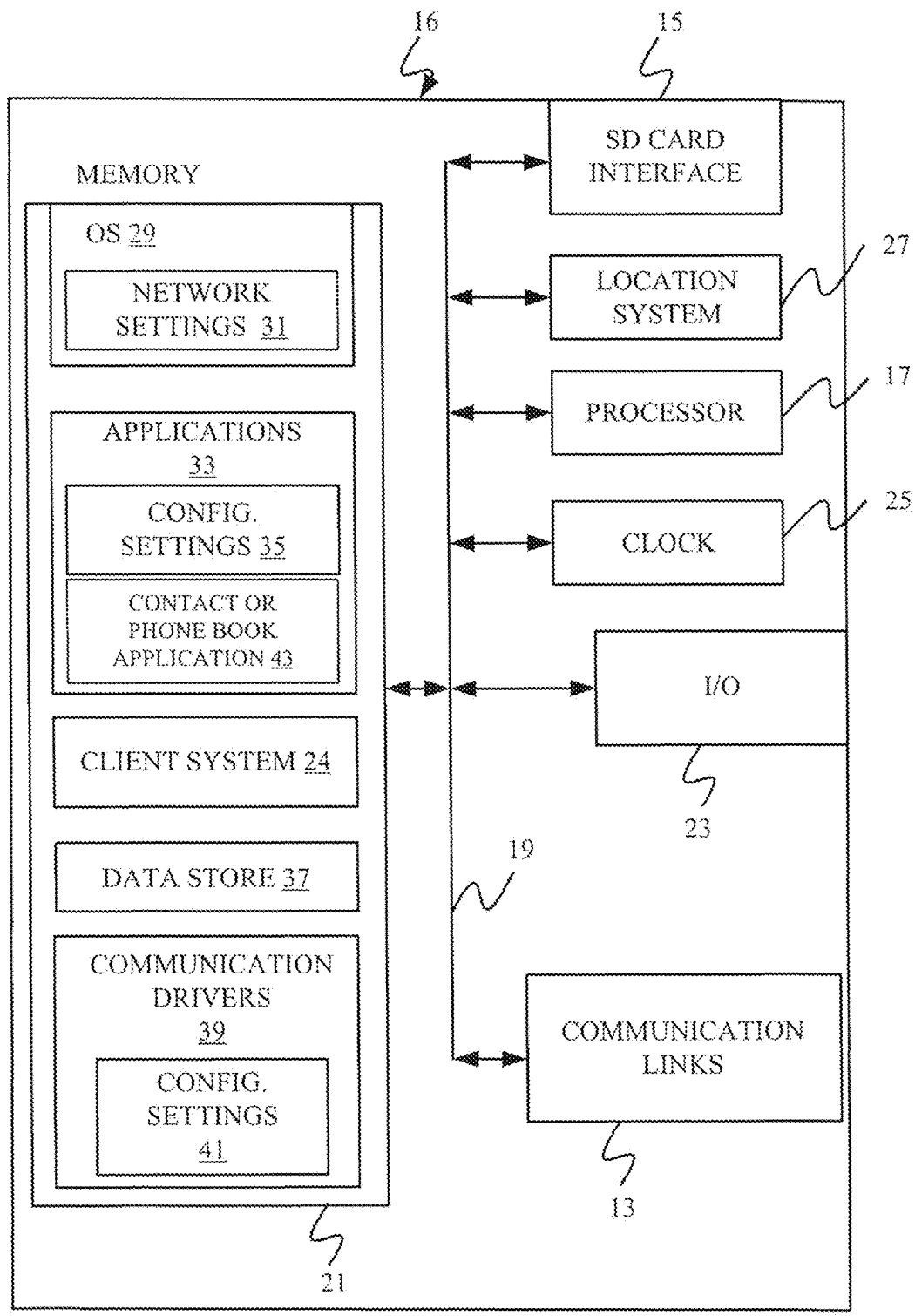
FIGS. 7-9 show examples of mobile devices that can be used in the machines illustrated in the previous figures.
Figure 8:
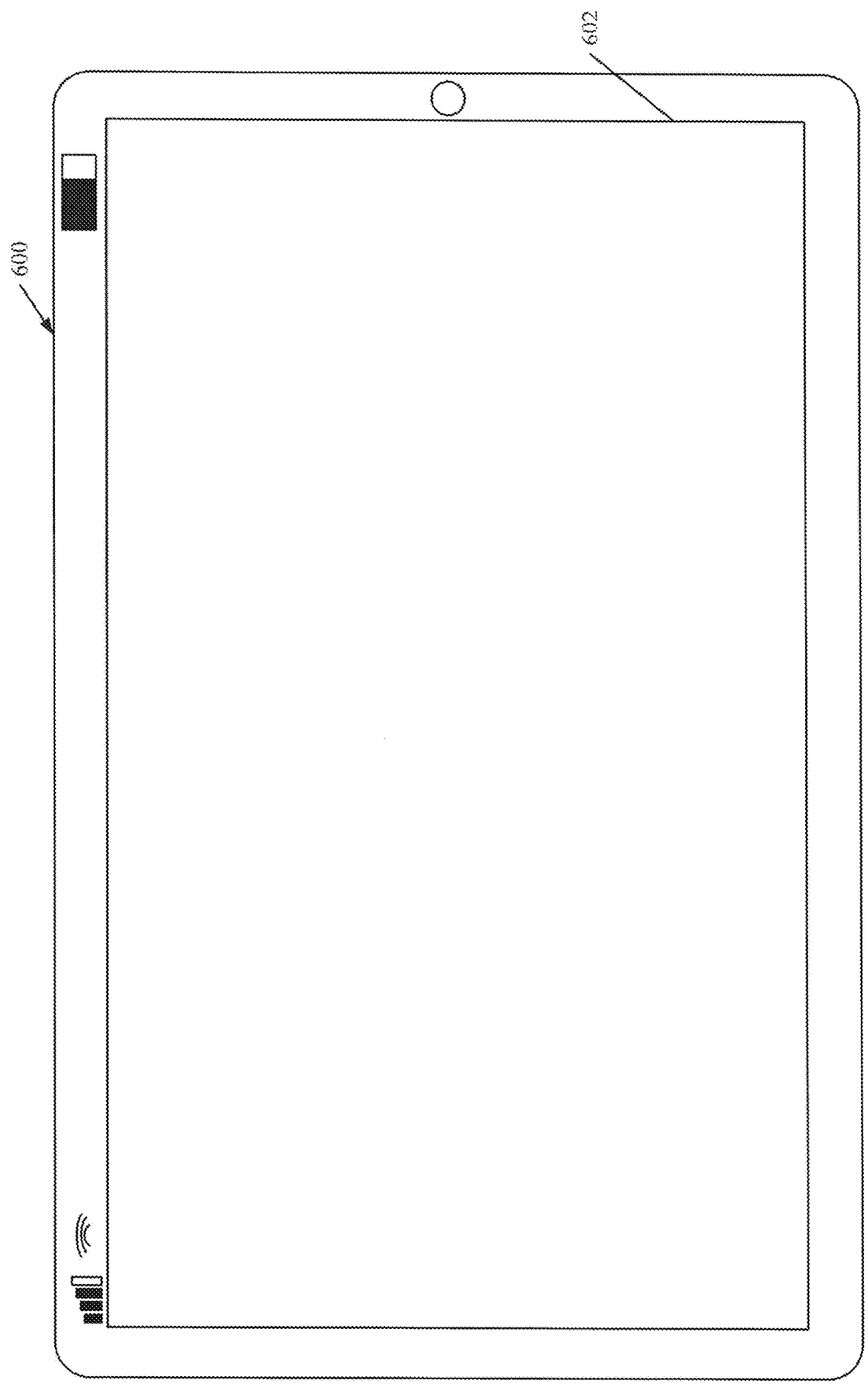
Figure 9:
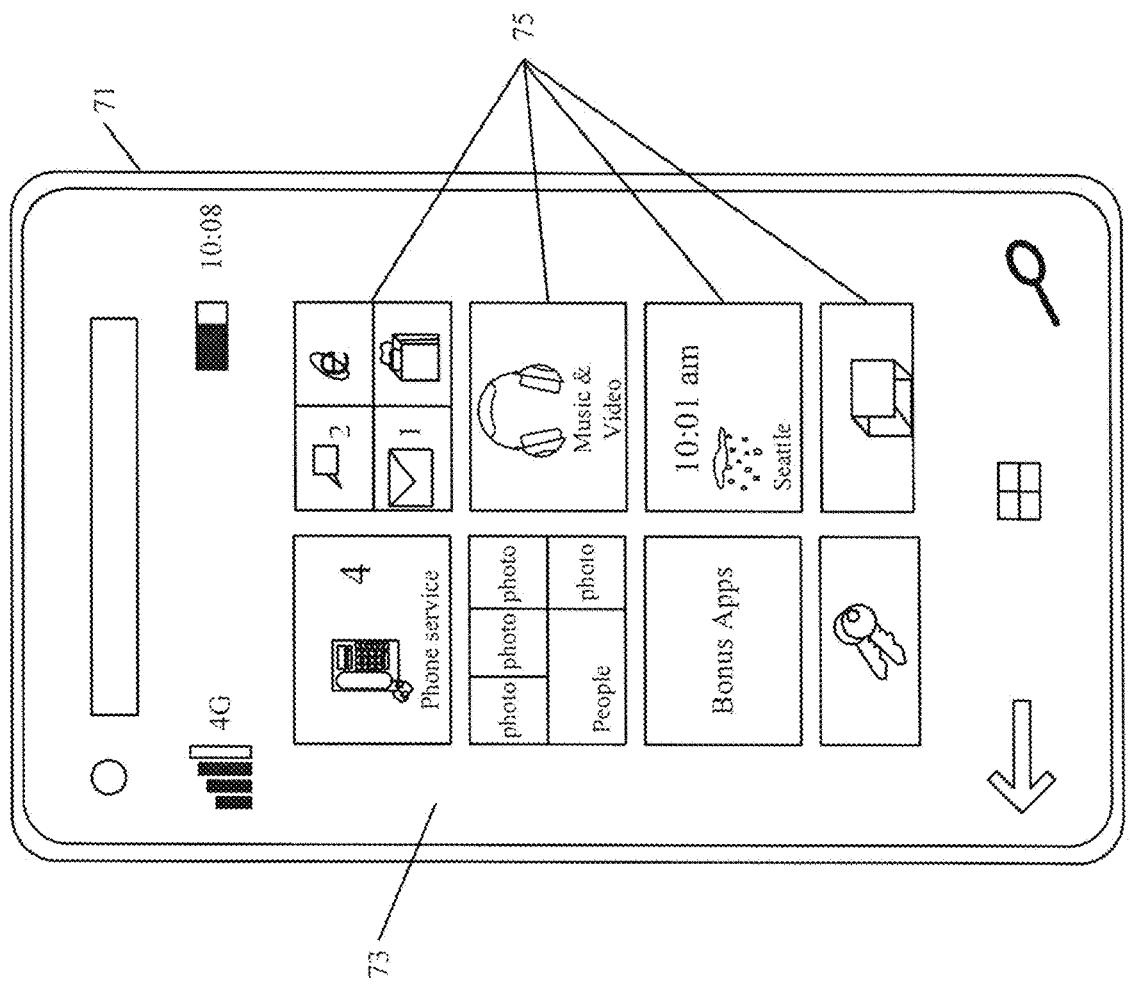

FIG. 7 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 8-9 are examples of handheld or mobile devices.

FIG. 7 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
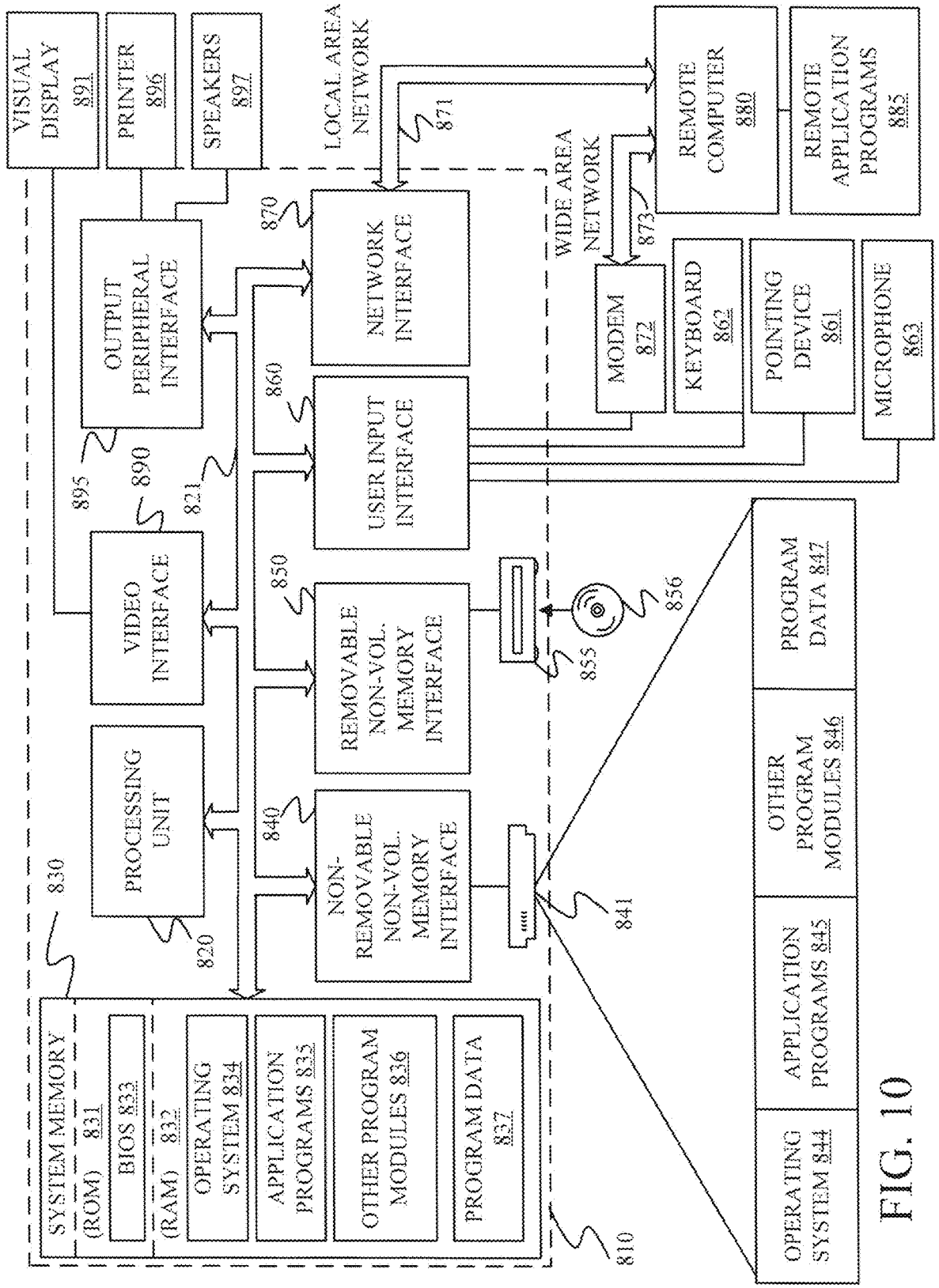
FIG. 10 is a block diagram showing one example of a computing environment that can be used with the machines illustrated in the previous figures.

FIG. 10 is one example of a computing environment in which elements of FIG. 2, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile agricultural machine, comprising:
a controllable subsystem;
a pose detection sensor that identifies a geographic position and an orientation of the pose detection sensor and generates a position signal and an orientation signal;
a point cloud identification system that identifies a point cloud with a set of points that are co-planar with one another, in a fixed spatial relation to the pose detection sensor so that, as the mobile agricultural machine moves, the point cloud moves, the set of points being coplanar with a plane section, that is estimated to correspond to a ground surface on which the mobile agricultural machine is located and that are spaced from one another by a given distance, the set of points including a first point that is closest, of all points in the point cloud, to the pose detection sensor;

geographic map location identifier logic that generates a map structure representing a geographic area and having a set of map cells and corresponding to a set of global coordinates;
an elevation map generation system that generates an elevation value for each point in the point cloud and a weight value for each point in the point cloud, the weight value being related to a distance of each point from the first point;
map layer generator logic that correlates the elevation values and weight values generated for the points in the point cloud with the map cells on which the point cloud is disposed, to generate a first elevation map layer; and
control signal generator logic that generates a control signal to control the controllable subsystem based on the first elevation map layer.

Example 2 is the mobile agricultural machine of any or all previous examples wherein the elevation map generator system comprises:
value aggregation logic that aggregates elevation values for multiple points in the point cloud if the multiple points are in a same map cell in the map structure.

Example 3 is the mobile agricultural machine of any or all previous examples wherein the pose detection sensor comprises:
trigger detection logic configured to identify a pose detection trigger and to generate a trigger signal based on detecting the pose detection trigger.

Example 4 is the mobile agricultural machine of any or all previous examples wherein the pose detection sensor is configured to take a pose measurement to identify the geographic location and orientation, in a global coordinate system, of the pose detection sensor based on the trigger detection signal.

Example 5 is the mobile agricultural machine of any or all previous examples wherein the elevation map generation system comprises:
elevation value generator logic configured to generate the elevation value for each point in the point cloud, corresponding to each pose measurement taken by the pose detection sensor.

Example 6 is the mobile agricultural machine of any or all previous examples wherein the elevation map generation system comprises:
weighting function logic configured to generate the weight value for each point in the point cloud, corresponding to each pose measurement taken by the pose detection sensor.

Example 7 is the mobile agricultural machine of any or all previous examples wherein the value aggregation logic is configured to aggregate the elevation values in the map cells in the first elevation map layer with additional elevation values, corresponding to subsequent pose measurements, based on the weight value for each point in the point cloud.

Example 8 is the mobile agricultural machine of any or all previous examples wherein the value aggregation logic is configured to aggregate multiple weight values corresponding to multiple points in the point cloud, when the multiple points are in a same map cell.

Example 9 is the mobile agricultural machine of any or all previous examples wherein the e map layer generator logic is configured to generate a second map layer comprising, for each map cell, the aggregated weight values for that map cell.

Example 10 is the mobile agricultural machine of any or all previous examples wherein the map layer generator logic is configured to generate the elevation map structure with a third map layer comprising, for each map cell, a number of elevation values aggregated into the aggregated elevation value for that map cell.

Example 11 is the mobile agricultural machine of any or all previous examples wherein the map layer generator logic is configured to generate the elevation map structure with a fourth map layer comprising, for each map cell, a variance in the elevation values aggregated into the aggregated elevation value for that map cell.

Example 12 is the mobile agricultural machine of any or all previous examples and further comprising:

a point cloud configuration system configured to detect user configuration inputs and to configure, based on the user configuration inputs, a resolution of the point cloud indicative of the distance between the points in the point cloud from one another, a size of the point cloud indicative of a number of points in the point cloud, and an offset indicative of a position of the point cloud relative to the pose detection sensor in the mobile agricultural machine.

Example 13 is the mobile agricultural machine of any or all previous examples wherein the controllable subsystem comprises:

a movable portion movably coupled relative to a frame of the mobile agricultural machine; and a height control actuator that is actuatable to control a height of the movable portion, the control signal generator configured to generate the control signal to control the height actuator based on the elevation map.

Example 14 is a method of controlling a mobile agricultural machine, the method comprising:

detecting a geographic position and an orientation of a portion of the mobile agricultural machine;

generating a position signal and an orientation signal, with a pose detection sensor, indicative of the detected geographic position and orientation;

identifying a point cloud with a set of points that are co-planar with one another and with a plane section that is estimated to correspond to a ground surface, the set of points being in a fixed spatial relation to the pose detection sensor, and being spaced from one another by a given distance, the set of points including a first point corresponding to a position that is closest, of all points in the point cloud, to the pose detection sensor;

generating a map structure representing a geographic area and having a set of map cells, the map structure corresponding to a set of global coordinates;

generating an elevation value for each point in the point cloud and a weight value for each point in the point cloud, the weight value being related to a distance of each point from the first point;

correlating the elevation values and the weight values to the map cells on which the point cloud is disposed; and generating a first elevation map layer based on the correlated elevation values and weight values.

Example 15 is the method of any or all previous examples wherein detecting a geographic position and orientation comprises:

identifying a pose detection trigger and to generate a trigger signal based on detecting the pose detection trigger; and taking a pose measurement to identify the geographic location and orientation, in a global coordinate system, of the pose detection sensor based on the trigger detection signal.

Example 16 is the method of any or all previous examples wherein generating the elevation map comprises:

generating the elevation value for each point in the point cloud, corresponding to each pose measurement taken by the pose detection sensor; and generating the weight value for each point in the point cloud, corresponding to each pose measurement taken by the pose detection sensor, by applying a weighting function that has a value that decreases with distance from the first point at a rate determined by a user configurable parameter in the weighting function.

Example 17 is the method of any or all previous examples wherein generating a first map layer comprises:

aggregating the elevation value corresponding to each map cell, with additional elevation values, corresponding to subsequent pose measurements, based on the weight value for each point in the point cloud; and aggregating the weight value corresponding to each map cell, with additional weight values, corresponding to subsequent pose measurements.

Example 18 is the method of any or all previous examples and further comprising:

generating an elevation map structure with the first map layer, a second map layer comprising, for each map cell, the aggregated weight values for that point, a third map layer comprising, for each point in the point cloud, a number of elevation values aggregated into the aggregated elevation value for that map cell, and a fourth map layer comprising, for each map cell, a variance in the elevation values aggregated into the aggregated elevation value for that map cell.

Example 19 is the method of any or all previous examples and further comprising:

detecting user configuration inputs and configuring, based on the user configuration inputs, a resolution of the point cloud indicative of the distance between the points in the point cloud from one another, a size of the point cloud indicative of a number of points in the point cloud, and an offset indicative of a position of the point cloud relative to the mobile agricultural machine.

Example 20 is a sensing system on a mobile agricultural machine, comprising:

a pose detection sensor that identifies a pose of the pose detection sensor and generates a pose signal;

a point cloud identification system that identifies a point cloud with a set of points that are in a fixed spatial relation relative to the pose detection sensor, that are co-planar with one another, and that are spaced from one another by a given distance, the set of points including a first point corresponding to a position that is closest, of all points in the point cloud, to the pose detection sensor;

geographic map location identifier logic configured to generate a map structure representing a geographic area and having a set of map cells, each corresponding to a set of global coordinates; and an elevation map generation system that generates an elevation value for each point in the point cloud and a weight value for each point in the point cloud, the weight value being related to a distance of each point from the first point, the elevation map generation system correlating the elevation values and the weight values with the map cells in which the points in the point cloud are disposed, to generate an elevation map layer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile agricultural machine, comprising:
a controllable subsystem;
a pose detection sensor that identifies a geographic position and an orientation of the pose detection sensor and generates a position signal and an orientation signal;
a point cloud identification system that identifies a point cloud with a set of points that are co-planar with one another, in a fixed spatial relation to the pose detection sensor so that, as the mobile agricultural machine moves, the point cloud moves, the set of points being coplanar with a plane section, that is estimated to correspond to a ground surface on which the mobile agricultural machine is located and that are spaced from one another by a given distance, the set of points including a first point that is closest, of all points in the point cloud, to the pose detection sensor;
geographic map location identifier logic that generates a map structure representing a geographic area and having a set of map cells and corresponding to a set of global coordinates;
an elevation map generation system that generates an elevation value for each point in the point cloud and a weight value for each point in the point cloud, the weight value being related to a distance of each point from the first point;
map layer generator logic that correlates the elevation values and weight values generated for the points in the point cloud with map cells on which the point cloud is disposed, in the set of map cells, to generate a first elevation map layer; and
control signal generator logic that generates a control signal to control the controllable subsystem based on the first elevation map layer.

2. The mobile agricultural machine of claim 1 wherein the elevation map generator system comprises:
value aggregation logic that aggregates elevation values for multiple points in the point cloud if the multiple points are in a same map cell in the map structure.

3. The mobile agricultural machine of claim 2 wherein the pose detection sensor comprises:
trigger detection logic configured to identify a pose detection trigger and to generate a trigger signal based on detecting the pose detection trigger.

4. The mobile agricultural machine of claim 3 wherein the pose detection sensor is configured to take a pose measurement to identify the geographic location and orientation, in a global coordinate system, of the pose detection sensor based on the trigger detection signal.

5. The mobile agricultural machine of claim 4 wherein the elevation map generation system comprises:
elevation value generator logic configured to generate the elevation value for each point in the point cloud, corresponding to each pose measurement taken by the pose detection sensor.

6. The mobile agricultural machine of claim 5 wherein the elevation map generation system comprises:
weighting function logic configured to generate the weight value for each point in the point cloud, corresponding to each pose measurement taken by the pose detection sensor.

7. The mobile agricultural machine of claim 6 wherein the value aggregation logic is configured to aggregate the elevation values in the map cells in the first elevation map layer with additional elevation values, corresponding to subsequent pose measurements, based on, the weight value for each, point in the point cloud.

8. The mobile agricultural machine of claim 7 wherein the value aggregation logic is configured to aggregate multiple weight values corresponding to multiple points in the point cloud, when the multiple points are in a same map cell.

9. The mobile agricultural machine of claim 8 wherein the map layer generator logic is configured to generate a second elevation map layer comprising the aggregated weight values for each map cell on which the point cloud is disposed, in the set of map cells.

10. The mobile agricultural machine of claim 9 wherein the map layer generator logic is configured to generate a third elevation map layer comprising a number of elevation values aggregated into the aggregated elevation value for each map cell on which the point cloud is disposed, in the set of map cells.

11. The mobile agricultural machine of claim 10 wherein the map layer generator logic is configured to generate a fourth elevation map layer comprising a variance in the elevation values aggregated into the aggregated elevation value for each map cell on which the point cloud is disposed, in the set of map cells.

12. The mobile agricultural machine of claim 1 and further comprising:
a point cloud configuration system configured to detect user configuration inputs and to configure, based on the user configuration inputs, a resolution of the point cloud indicative of the given distance between the points in the point, cloud from one another, a size of the point cloud indicative of a number of points in, the point cloud, and an offset indicative of a position of the point, cloud relative to the pose detection sensor in the mobile agricultural machine.

13. The mobile agricultural machine of claim 1 wherein the controllable subsystem comprises:
a movable portion movably coupled relative to a frame of the mobile agricultural machine; and
a height control actuator that is actuatable to control a height of the movable portion, the control signal generator configured to generate the control signal to control the height actuator based on the first elevation map layer.

14. The method of claim 13 and further comprising:
detecting user configuration inputs and configuring, based on the user configuration inputs, a resolution of the point cloud indicative of the given distance between the points in the point cloud from one another, a size of the point cloud indicative of a number of points in the point cloud, and an offset indicative of a position of the point cloud relative to the mobile agricultural machine.

15. A method of controlling a mobile agricultural machine, the method comprising:
detecting a geographic position and an orientation of a portion of the mobile agricultural machine;
generating a position signal and an orientation signal, with a pose detection sensor, indicative of the detected geographic position and orientation;
identifying a point cloud with a set of points that are co-planar with one another and with a plane, section that is estimated to correspond to a ground surface, the set of points being in a fixed spatial relation to the pose detection sensor, and being spaced from one another by a given distance, the set of points including a first point corresponding to a position that is closest, of all points in the point cloud, to the pose detection sensor;
generating a map structure representing a geographic area and having a set of map cells, the map structure corresponding to a set of global coordinates;

generating an elevation value for each point in the point cloud and a weight value for each point in the point cloud, the weight value being, related to a distance of each point from the first point;

correlating the elevation values and the weight values to the map cells on which the point cloud is disposed, in the set of map cells; and generating a first elevation map layer based on the correlated elevation values and weight values.

16. The method of claim 15 wherein detecting the geographic position and the orientation of the portion of the mobile agricultural machine comprises:

identifying a pose detection trigger and to generate a trigger signal based on detecting the pose detection trigger; and taking a pose measurement to identify the geographic location and orientation, in a global coordinate system, of the pose detection sensor based on the trigger detection signal.

17. The method of claim 16 wherein generating the first elevation map layer comprises:

generating the elevation value for each point in the point cloud, corresponding to each pose measurement taken by the pose detection sensor; and generating the weight value for each point in the point cloud, corresponding to each pose measurement taken by the pose detection sensor, by applying a weighting function that has a value that decreases with distance from the first point at a rate determined by a user configurable parameter in the weighting function.

18. The method of claim 17 wherein generating the first elevation map layer comprises:

aggregating the elevation value corresponding to each map cell on which the point cloud is disposed, in the set of map cells, with additional elevation values, corresponding to, subsequent pose measurements, based on the weight value for each point in the point cloud; and aggregating the weight value corresponding to each map cell on which the point cloud is disposed, in the set of map cells, with additional weight values, corresponding to subsequent pose measurements.

19. The method of claim 18 and further comprising:

generating an elevation map structure with the first elevation map layer, a second elevation map layer comprising the aggregated weight values for each map cell on which the point cloud is disposed, in the set of map cells, a third elevation map layer comprising a number of elevation values aggregated into the aggregated elevation value for each map cell on which the point cloud is disposed, and a fourth elevation map layer comprising a variance in the elevation values aggregated into the aggregated elevation value for each map cell on which the point cloud is disposed, in the set of map cells.

20. A sensing system on a mobile agricultural machine, comprising:

a pose detection sensor that identifies a pose of the pose detection sensor and generates a pose signal;

a point cloud identification system that identifies a point cloud with a set of points that are in a fixed spatial relation relative to the pose detection sensor, that are co-planar with one another, and that are spaced from one another by a given distance, the set of points including a first point corresponding to a position that is closest, of all points in the point cloud, to the pose detection sensor;

geographic map location identifier logic configured to generate a map structure representing a geographic area and having a set of map cells, each corresponding to a set of global coordinates; and an elevation map generation system that generates an elevation value for each point in the point cloud and a weight value for each point in the point cloud, the weight value being related to a distance of each point from the first point, the elevation map generation system correlating the elevation values and the weight values with map cells in which the points in the point cloud are disposed, in the set of map cells, to generate an elevation map layer.

\* \* \* \* \*